United States Patent
Wang

(10) Patent No.: US 12,153,194 B2
(45) Date of Patent: Nov. 26, 2024

(54) LENS ASSEMBLY

(71) Applicants: Sintai Optical (Shenzhen) Co., Ltd., ShenZhen (CN); Asia Optical Co., Inc., Taichung (TW)

(72) Inventor: Li-Kai Wang, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 726 days.

(21) Appl. No.: 17/352,423

(22) Filed: Jun. 21, 2021

(65) Prior Publication Data
US 2022/0171161 A1    Jun. 2, 2022

(30) Foreign Application Priority Data

Dec. 1, 2020   (CN) .......................... 202011379582.0

(51) Int. Cl.
G02B 13/00     (2006.01)
G02B 9/64      (2006.01)

(52) U.S. Cl.
CPC .......... *G02B 13/0015* (2013.01); *G02B 9/64* (2013.01)

(58) Field of Classification Search
CPC .. G02B 13/0015; G02B 13/005; G02B 13/02; G02B 9/64
USPC .......................................................... 359/754
See application file for complete search history.

(56) References Cited

U.S. PATENT DOCUMENTS

| | | | |
|---|---|---|---|
| 9,720,209 B2 | 8/2017 | Kunugise et al. | |
| 2015/0312454 A1* | 10/2015 | Iiyama | G02B 13/16 348/360 |

FOREIGN PATENT DOCUMENTS

| | | |
|---|---|---|
| CN | 103336353 A | 10/2013 |
| CN | 107976785 A | 5/2018 |
| CN | 111273428 A | 6/2020 |
| JP | 2005055625 A | 3/2005 |
| JP | 2016065906 A | 4/2016 |

OTHER PUBLICATIONS

Gross, Herbert (ed.) Handbook of Optical Systems, vol. 3: Aberration Theory and Correction of Optical Systems, Wiley-Vch (Year: 2007).*

* cited by examiner

*Primary Examiner* — Marin Pichler
*Assistant Examiner* — Justin W. Hustoft
(74) *Attorney, Agent, or Firm* — McClure, Qualey & Rodack, LLP

(57) ABSTRACT

A lens assembly includes a first, second, third, fourth, fifth, sixth, seventh, eighth, and ninth lenses. The first lens is a biconvex lens with positive refractive power. The second lens is with negative refractive power and includes a concave surface facing the object side. The third lens is a biconvex with positive refractive power and includes a convex surface facing the object side and another convex surface facing the image side. The fifth lens is a biconcave lens with negative refractive power. The fourth, sixth, and ninth lenses are with positive refractive power. The seventh lens is with positive refractive power. The eighth lens is with negative refractive power. The first, second, third, fourth, fifth, sixth, seventh, eighth, and ninth lenses are arranged in order from the object side to the image side along an optical axis.

6 Claims, 15 Drawing Sheets

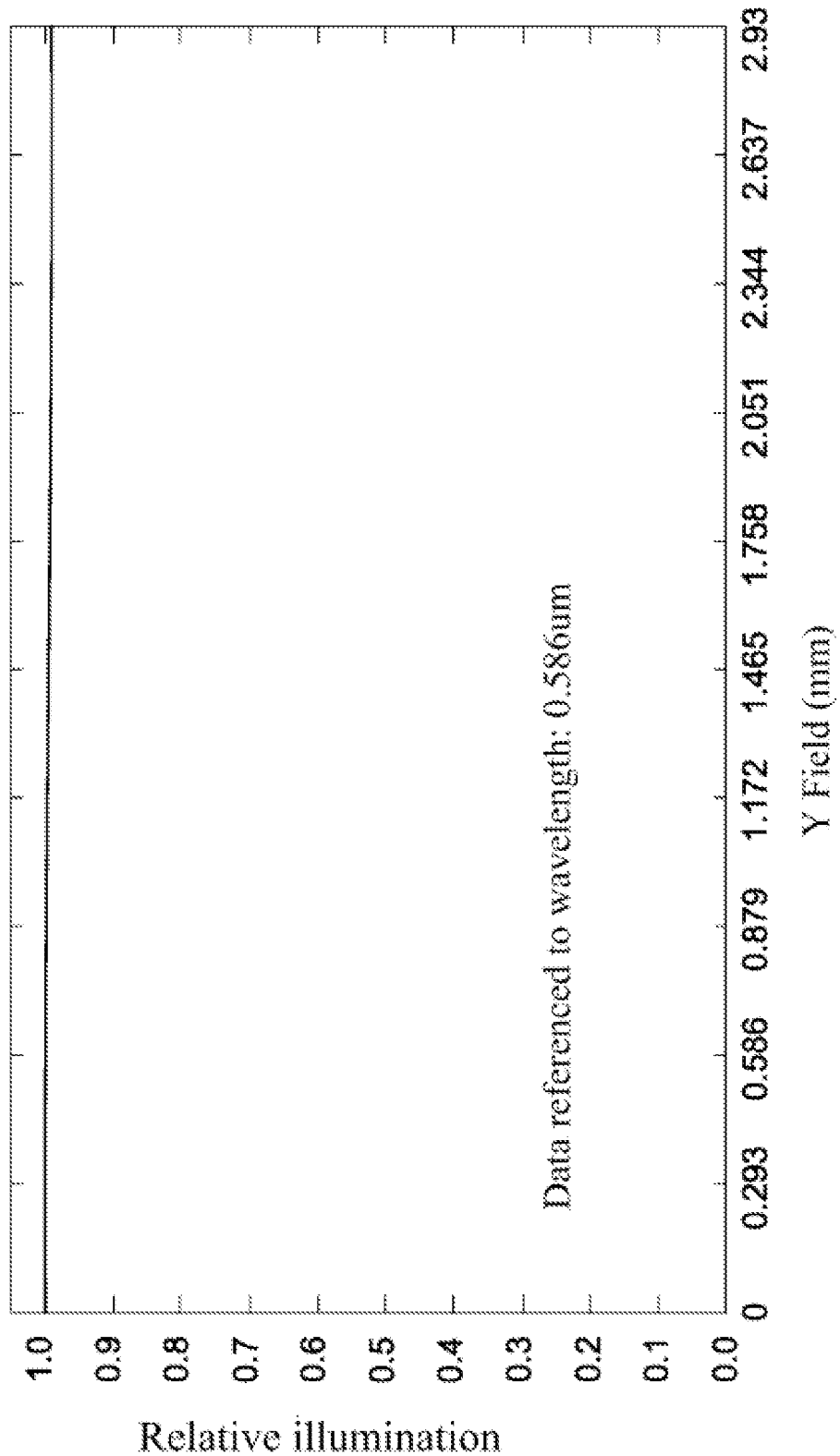

LENS ASSEMBLY

BACKGROUND OF THE INVENTION

Field of the Invention

The invention relates to a lens assembly.

Description of the Related Art

The current development trend of a lens assembly is toward miniaturization. Additionally, the lens assembly is developed to have large F-number and high resolution in accordance with different application requirements. However, the known lens assembly can't satisfy such requirements. Therefore, the lens assembly needs a new structure in order to meet the requirements of miniaturization, large F-number and high resolution.

BRIEF SUMMARY OF THE INVENTION

The invention provides a lens assembly to solve the above problems. The lens assembly of the invention is provided with characteristics of a shortened total lens length, a smaller F-number, a high resolution and still has a good optical performance.

The lens assembly in accordance with an exemplary embodiment of the invention includes a first lens, a second lens, a third lens, a fourth lens, a fifth lens, a sixth lens, a seventh lens, an eighth lens, and ninth lens, all of which are arranged in order from an object side to an image side along an optical axis. The first lens is a biconvex lens with positive refractive power, and includes a convex surface facing on object side and another convex surface facing an image side. The second lens is with negative refractive power and includes a concave surface facing the object side. The third lens is a biconvex with positive refractive power and includes a convex surface facing the object side and another convex surface facing the image side. The fourth lens is with positive refractive power. The fifth lens is a biconcave lens with negative refractive power and includes a concave surface facing the object side and another concave surface facing the image side. The sixth lens is with positive refractive power. The seventh lens is with refractive power. The eighth lens is with negative refractive power. The ninth lens is with positive refractive power.

In another exemplary embodiment, the lens assembly further includes a stop disposed between the second lens and the third lens. The second lens includes a convex surface or a concave surface or a plane surface facing the image side. The fourth lens is a meniscus lens and includes a concave surface facing the object side and a convex surface facing the image side. The sixth lens is a meniscus lens and includes a convex surface facing the object side and another concave surface facing the image side. The seventh lens is a meniscus lens with negative refractive power and includes a concave surface facing the object side and another convex surface facing the image side. The eighth lens is a meniscus lens and includes a concave surface facing the object side and another convex surface facing the image side. The ninth lens is a biconvex lens and includes a convex surface facing the object side and another convex surface facing the image side.

The lens assembly in accordance with another exemplary embodiment of the invention includes a first lens, a second lens, a third lens, a fourth lens, a fifth lens, a sixth lens, a seventh lens, an eighth lens, a ninth lens, all of which are arranged in order from an object side to an image side along an optical axis. The first lens is with positive refractive power and a convex surface facing the image side. The second lens is with negative refractive power and a concave surface facing the object side and another convex surface or a concave surface or a plane surface facing the image side. The third lens is with refractive power and includes a convex surface facing the image side. The fourth lens is a meniscus lens with positive refractive power and a concave surface facing the object side and another convex surface facing the image side. The fifth lens is with negative refractive power and includes a concave surface facing the image side. The sixth lens is with positive refractive power and includes a concave surface facing the image side. The seventh lens is a meniscus lens with refractive power and includes a concave surface facing the object side and another convex surface facing the image side. The eighth lens is a meniscus lens with negative refractive power and includes a concave surface facing the object side and another convex surface facing the image side. The ninth lens is with positive refractive power and includes a convex surface facing the image side.

In another exemplary embodiment, the lens assembly satisfies at least one of the following conditions: $2.5<|f_4/f_7|<7.7$; $4.3<|R_{41}/(f_5+f_6)|<10.1$; $6<T_{67}/CT_4-CT_5)<8$; $1<|R_{82}/T_{67}|<12.2$; $1<|f_2/(f_3-f_5)|<2$; $0.4<|R_{82}/R_{11}|<6.5$; $1.3<|R_{32}/R_{21}|<1.8$; $0.4<|R_{72}/R_{62}|<6.3$; $0.8<|R_{31}/R_{91}|<1.13$; $1.8<|R_{51}/R_{31}|<2.8$; $2.75<|f_7/f_8|/f_9<3.22$; wherein $T_{67}$ is an interval an image side surface of the sixth lens to an object side surface of the seventh lens along the optical axis, $CT_4$ is a thickness of the fourth lens along the optical axis, $CT_5$ is a thickness of the fifth lens along the optical axis, $R_{11}$ is a radius of curvature of an object side surface of the first lens, $R_{21}$ is a radius of curvature of an object side surface of the second lens, $R_{31}$ is a radius of curvature of an object side surface of the third lens, $R_{32}$ is a radius of curvature of an image side surface of the third lens, $R_{41}$ is a radius of curvature of an object side surface of the fourth lens, $R_{51}$ is a radius of curvature of an object side surface of the fifth lens, $R_{62}$ is a radius of curvature of an image side surface of the sixth lens, $R_{72}$ is a radius of curvature of an image side surface of the seventh lens, $R_{82}$ is a radius of curvature of an image side surface of the eighth lens, $R_{91}$ is a radius of curvature of an object side surface of the ninth lens, $f_2$ is an effective focal length of the second lens, $f_3$ is an effective focal length of the third lens, $f_4$ is an effective focal length of the fourth lens, $f_5$ is an effective focal length of the fifth lens, $f_6$ is an effective focal length of the sixth lens, $f_7$ is an effective focal length of the seventh lens, $f_8$ is an effective focal length of the eighth lens and $f_9$ is an effective focal length of the ninth lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 6D is a relative illumination diagram of the lens assembly in accordance with the third embodiment of the invention.

DETAILED DESCRIPTION OF THE INVENTION

Figure 1:
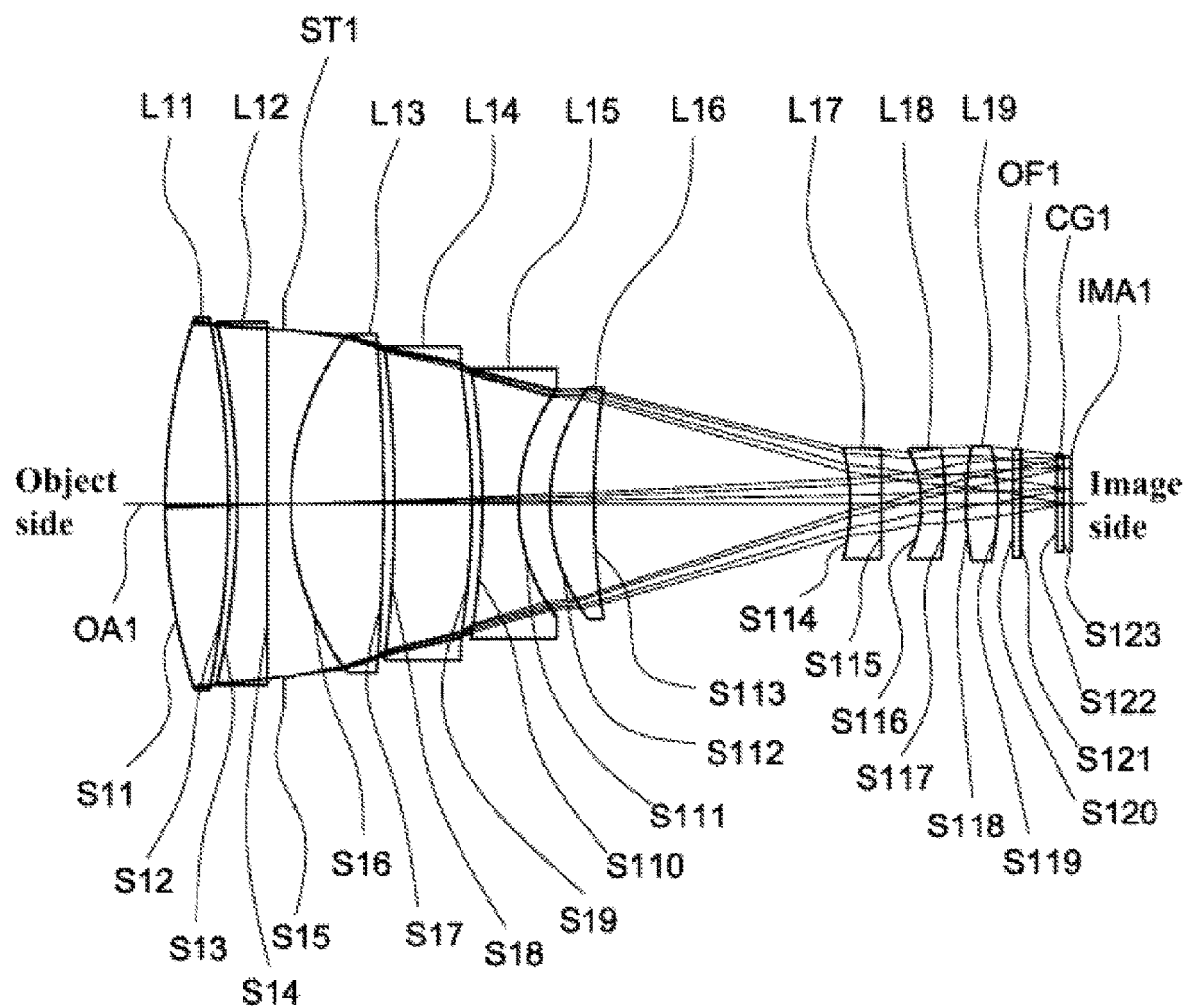
FIG. 1 is a lens layout and optical path diagram of a lens assembly in accordance with a first embodiment of the invention.

The following description is made for the purpose of illustrating the general principles of the invention and should not be taken in a limiting sense. The scope of the invention is best determined by reference to the appended claims.

The present invention provides a lens assembly including a first lens, a second lens, a third lens, a fourth lens, a fifth lens, a sixth lens, a seventh lens, an eighth lens, and a ninth lens. The first lens is a biconvex lens and includes a convex surface facing an object side and another convex surface facing on image side. The second lens is with negative refractive power and includes a concave surface facing the object side. The third lens is a biconvex lens is with positive refractive power and includes a convex surface facing the object side and another convex surface facing the image side. The fourth lens is with positive refractive power. The fifth lens is a biconcave lens with negative refractive power and includes a concave surface facing the object side and another concave surface facing the image side. The sixth lens is with positive refractive power. The seventh lens is with refractive power. The eighth lens is with negative refractive power. The ninth lens is with positive refractive power. The first lens, the second lens, the third lens, the fourth lens, the fifth lens, the sixth lens, the seventh lens, the eighth lens, and the ninth lens are arranged in order from the object side to the image side along an optical axis.

The present invention provides another lens assembly including a first lens, a second lens, a third lens, a fourth lens, a fifth lens, a sixth lens, a seventh lens, an eighth lens, and a ninth lens. The first lens is with positive refractive power and includes a convex surface facing an image side. The second lens is with negative refractive power and includes a concave surface facing the object side and another convex surface or concave surface or plane surface facing the image side. The third lens is with refractive power and includes a convex surface facing the image side. The fourth lens is a meniscus lens and includes a concave surface facing the object side and another convex surface facing the image sides. The fifth lens is with negative refractive power and includes a concave surface facing the image side. The sixth lens is with positive refractive power and includes a concave surface facing the image side. The seventh lens is a meniscus lens with refractive power and includes a concave surface facing the object side and another convex surface facing the image side. The eighth lens is a meniscus lens with negative refractive power and includes a concave surface facing the object side and another convex surface facing the image side. The ninth lens is with positive refractive power and includes a convex surface facing the image side. The first lens, the second lens, the third lens, the fourth lens, the fifth lens, the sixth lens, the seventh lens, the eighth lens, and the ninth lens are arranged in order from the object side to the image side along an optical axis.

Referring to Table 1, Table 3, and Table 5, wherein Table 1, Table 3, and Table 5 show optical specification in accordance with a first, second, and third embodiments of the invention respectively.

Figure 3:
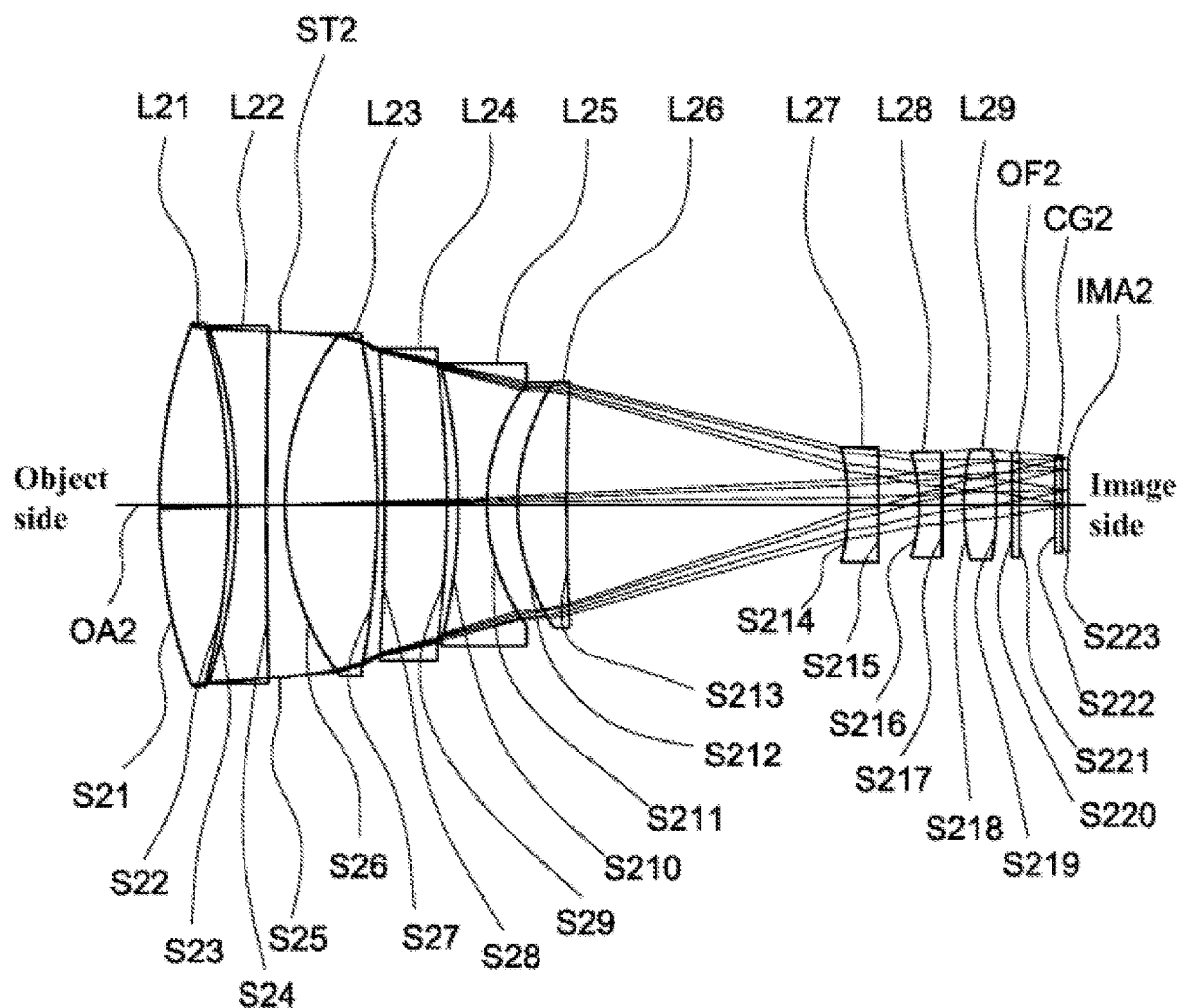
FIG. 3 is a lens layout and optical path diagram of a lens assembly in accordance with a second embodiment of the invention.
Figure 5:
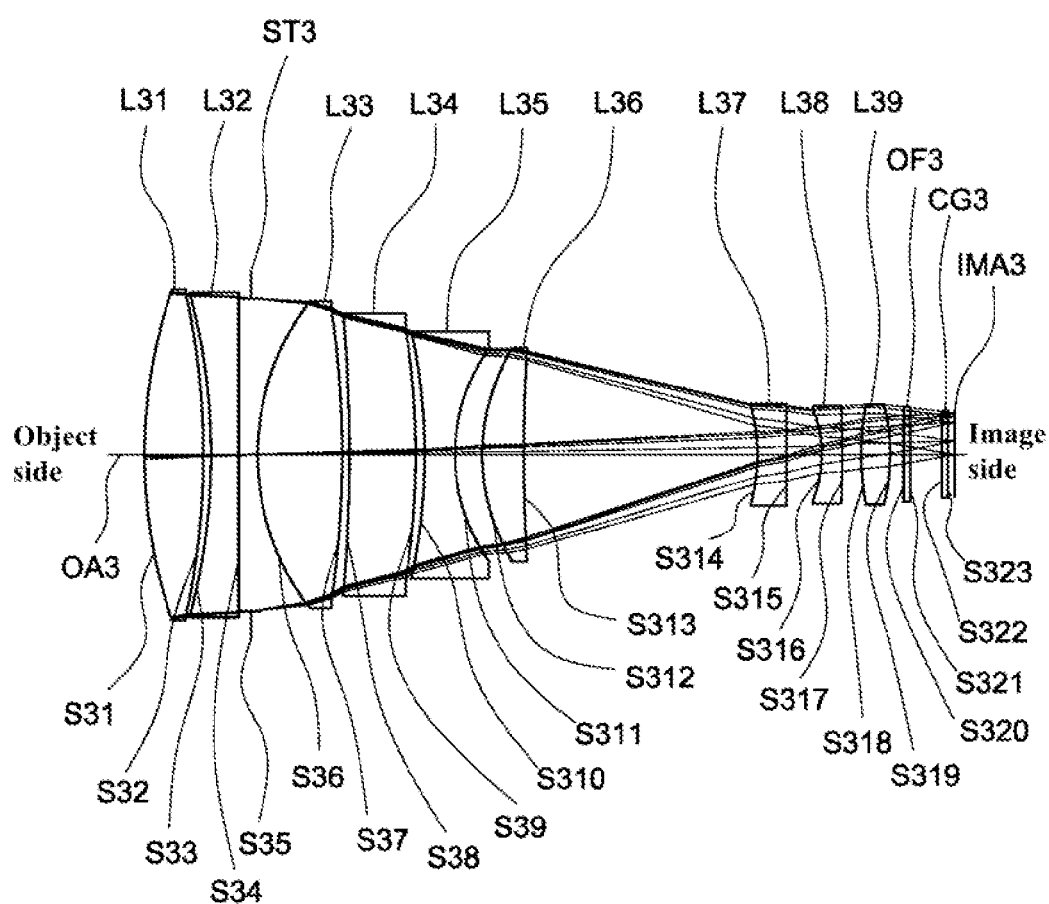
FIG. 5 is a lens layout and optical path diagram of a lens assembly in accordance with a third embodiment of the invention.

FIG. 1, FIG. 3, and FIG. 5 are lens layout and optical path diagrams of the lens assembly in accordance with the first, second, and third embodiments of the invention respectively.

The first lens L11, L21, L31 are biconvex lenses with positive refractive power and made of glass material, wherein the object side surfaces S11, S21, S31 are convex surfaces, the image side surfaces S12, S22, S32 are convex surfaces, and the object side surfaces S11, S21, S31 and the image side surfaces S12, S22, S32 are spherical surfaces.

The second lens L12, L22, L32 are with negative refractive power and made of glass material, wherein the object side surfaces S13, S23, S33 are concave surfaces, and the object side surfaces S13, S23, S33 are spherical surfaces.

The third lens L13, L23, L33 are biconvex lenses with positive refractive power and made of glass material, wherein the object side surfaces S16, S26, S36 are convex surfaces, and the image side surfaces S17, S27, S37 are convex surfaces, and the object side surfaces S16, S26, S36 and the image side surfaces S17, S27, S37 are spherical surfaces.

The fourth lens L14, L24, L34 are meniscus lenses with positive refractive power and made of glass material, wherein the object side surfaces S18, S28, S38 are concave surfaces, the image side surfaces S19, S29, S39 are convex surfaces, and the object side surfaces S18, S28, S38 and the image side surfaces S19, S29, S39 are spherical surfaces.

The fifth lens L15, L25, L35 are biconcave lenses with negative refractive power and made of glass material, wherein the object side surfaces S110, S210, S310 are concave surfaces, the image side surfaces S111, S211, S311 are concave surfaces, and the object side surfaces S110, S210, S310 and the image side surface S111, S211, S311 are spherical surfaces.

The sixth lens L16, L26, L36 are meniscus lenses with positive refractive power and made of glass material, wherein the object side surfaces S112, S212, S312 are convex surfaces, the image side surfaces S113, S213, S313 are concave surfaces, and the object side surfaces S112, S212, S312 and the image side surfaces S113, S213, S313 are spherical surfaces.

The seventh lens L17, L27, L37 are meniscus lenses with negative refractive power and made of glass material, wherein the object side surfaces S114, S214, S314 are concave surfaces, the image side surfaces S115, S215, S315 are convex surfaces, and the object side surfaces S114, S214, S314 and the image side surfaces S115, S215, S315 are spherical surfaces.

The eighth lens L18, L28, L38 are meniscus lenses with negative refractive power and made of glass material, wherein the object side surfaces S116, S216, S316 are concave surfaces, the image side surfaces S117, S217, S317 are convex surfaces, and the object side surfaces S116, S216, S316 and the image side surfaces S117, S217, S317 are spherical surfaces.

The ninth lens L19, L29, L39 are biconvex lenses with positive refractive power and made of glass material, wherein the object side surfaces S118, S218, S318 are convex surfaces, the image side surfaces S119, S219, S319 are convex surfaces, and the object side surfaces S118, S218, S318 and the image side surfaces S119, S219, S319 are spherical surfaces.

In addition, the lens assemblies 1, 2, 3 satisfy at least one of the following conditions:

$$2.5<|f_4/f_7|<7.7; \quad (1)$$

$$4.3<|R_{41}/(f_5+f_6)|<10.1; \quad (2)$$

$$6<T_{67}/(CT_4-CT_5)<8; \quad (3)$$

$$1<|R_{82}/T_{67}|<12.2; \quad (4)$$

$$0.4<|R_{82}/R_{11}|<6.5; \quad (5)$$

$$0.4<|R_{72}/R_{62}|<6.3; \quad (6)$$

$$0.8<R_{31}/R_{91}<1.13 \quad (7)$$

$$1.8<|R_{51}/R_{31}|<2.8 \quad (8)$$

$$2.75<|f_7+f_8|/f_9<3.22 \quad (9)$$

$$1<|f_2/(f_3-f_5)|<2 \quad (10)$$

$$1.3<|R_{32}/R_{21}|<1.8 \quad (11)$$

Wherein $f_2$ is an effective focal length of the second lenses L12, L22, L32 for the first to third embodiments, $f_3$ is an effective focal length of the third lenses L13, L23, L33 for the first to third embodiments, $f_4$ is an effective focal length of the fourth lenses L14, L24, L34 for the first to third embodiments, $f_5$ is an effective focal length of the fifth lenses L15, L25, L35 for the first to third embodiments, $f_6$ is an effective focal length of the sixth lenses L16, L26, L36 for the first to third embodiments, $f_7$ is an effective focal length of the seventh lenses L17, L27, L37 for the first to third embodiments, $f_8$ is an effective focal length of the eighth lenses L18, L28, L38 for the first to third embodiments, and $f_9$ is an effective focal length of the ninth lenses L19, L29, L39 for the first to third embodiments, $R_{11}$ is a radius of curvature of the object side surface S11, S21, S31 of the first lens L11, L21, L31 for the first to third embodiments, $R_{21}$ is a radius of curvature of the object side surface S13, S23, S33 of the second lens L12, L22, L32 for the first to third embodiments, $R_{31}$ is a radius of curvature of the object side surface S16, S26, S36 of the third lens L13, L23, L33 for the first to third embodiments, $R_{32}$ is a radius of curvature of the image side surface S17, S27, S37 of the third lens L13, L23, L33 for the first to third embodiments, $R_{41}$ is a radius of curvature of the object side surface S18, S28, S38 of the fourth lens L14, L24, L34 for the first to third embodiments, $R_{51}$ is a radius of curvature of the object side surface S110, S210, S310 of the fifth lens L15, L25, L35 for the first to third embodiments, $R_{62}$ is a radius of curvature of the image side surface S113, S213, S313 of the sixth lens L16, L26, L36 for the first to third embodiments, $R_{72}$ is a radius of curvature of the image side surface S115, S215, S315 of the seventh lens L17, L27, L37 for the first to third embodiments, $R_{82}$ is a radius of curvature of the image side surface S117, S217, S317 of the eighth lens L18, L28, L38 for the first to third embodiments, $R_{91}$ is a radius of curvature of the object side surface S118, S218, S318 of the ninth lens L19, L29, L39 for the first to third embodiments, $T_{67}$ is an interval from the image side surface S113, S213, S313 of the sixth lens L16, L26, L36 to the object side surface S114, S214, S314 of the seventh lens L17, L27, L37 along the optical axis OA1, OA2, OA3 respectively for the first to third embodiments, $CT_4$ is a thickness of the fourth lens L14, L24, L34 along the optical axis OA1, OA2, OA3 respectively for the first to third embodiments, $CT_5$ is a thickness of the fifth lens L15, L25, L35 along the optical axis OA1, OA2, OA3 respectively for the first to third embodiments, respectively for the first to third embodiments, With the lens assemblies 1, 2, 3 satisfying at least one of the above conditions (1)-(11), the resolution can be effectively increased, the aberration can be effectively corrected, and the chromatic aberration can be effectively corrected.

When the condition (1): $2.5<|f_4/f_7|<7.7$ is satisfied, it is provide sufficient the refractive power of the lens assembly, the field of view can be controlled, the aberration can be effectively corrected.

When the condition (2): $4.3<|R_{41}/(f_5+f_6)|<10.1$ is satisfied, the aberration can be effectively corrected, the resolution can be effectively increased.

When the condition (3): $6<T_{67}/(CT_4-CT_5)<8$ is satisfied, it provides sufficient thickness and interval of the lens assembly, off-axis the aberration can be effectively corrected.

When the condition (4): $1<|R_{82}/T_{67}|<12.2$ is satisfied, it provides sufficient thickness and interval of the lens assembly, off-axis the aberration can be effectively corrected.

When the condition (5): $0.4<|R_{82}/R_{11}|<6.5$ is satisfied, it provides sufficient thickness and interval of the lens assembly, off-axis the aberration can be effectively corrected.

When the condition (6): $0.4<|R_{72}/R_{62}|<6.3$ is satisfied, it provides sufficient thickness and interval of the lens assembly, off-axis the aberration can be effectively corrected.

When the condition (7): $0.8<|R_{31}/R_{91}|<1.13$ is satisfied, it provides sufficient thickness and interval of the lens assembly, off-axis the aberration can be effectively corrected.

When the condition (8): $1.8<|R_{51}/R_{31}|<2.8$ is satisfied, the field of view can be controlled, the aberration can be effectively corrected.

When the condition (9): $2.75<|f_7+f_8|/f_9<3.22$ is satisfied, the field of view can be controlled, the aberration can be effectively corrected.

When the condition (10): $1<|f_2/(f_3-f_5)|<2$ is satisfied, the aberration can be effectively corrected, the resolution can be effectively increased.

When the condition (11): $1.3<|R_{32}/R_{21}|<1.8$ is satisfied, the aberration can be effectively corrected, the resolution can be effectively increased.

A detailed description of a lens assembly in accordance with a first embodiment of the invention is as follows. Referring to FIG. 1, the lens assembly 1 includes a first lens L11, a second lens L12, a third lens L13, a fourth lens L14, a fifth lens L15, a sixth lens L16, a seventh lens L17, an eighth lens L18, a ninth lens L19, an optical filter OF1, and a cover glass CG1, all of which are arranged in order from an object side to an image side along an optical axis OA1. In operation, an image of light rays from the object side is formed at an image plane IMA1.

According to the foregoing, wherein: The second lens L12 is a meniscus lens, wherein the image side surfaces S14 is convex surfaces and the image side surface S14 is spherical surfaces; both of the object side surface S120 and image side surface S121 of the optical filter OF1 are plane surfaces; and both of the object side surface S122 and image side surface S123 of the cover glass CG1 are plane surfaces.

With the above design of the lenses and stop ST1 and at least any one of the conditions (1)-(11) satisfied, the lens assembly 1 can have an effective increased resolution, an effective corrected aberration, and is capable of an effective corrected chromatic aberration.

Table 1 shows the optical specification of the lens assembly 1 in FIG. 1.

TABLE 1

Effective Focal Length = 64.557 mm F-number = 2.8
Total Lens Length = 57.003 mm Field of View = 5.19 degrees

| Surface Number | Radius of Curvature (mm) | Thickness (mm) | Nd | Vd | Effective Focal Length (mm) | Remark |
|---|---|---|---|---|---|---|
| S11 | 39.285 | 4.044 | 1.497 | 81.608 | 46.64 | L11 |
| S12 | −54.62 | 0.491 | | | | |
| S13 | −52.604 | 1.981 | 1.654 | 39.683 | −87.44 | L12 |
| S14 | −663.89 | 0.885 | | | | |
| S15 | ∞ | 0.486 | | | | ST1 |
| S16 | 17.634 | 6.009 | 1.497 | 81.608 | 30.23 | L13 |
| S17 | −90.179 | 0.49 | | | | |
| S18 | −78.024 | 4.932 | 1.847 | 23.778 | 204.73 | L14 |
| S19 | −55.37 | 0.684 | | | | |
| S110 | −49.214 | 2.262 | 1.618 | 63.334 | −15.69 | L15 |
| S111 | 12.286 | 1.983 | | | | |
| S112 | 12.587 | 2.836 | 1.497 | 81.608 | 33.18 | L16 |
| S113 | 49.18 | 16.03 | | | | |
| S114 | −12.773 | 1.007 | 1.497 | 81.608 | −26.87 | L17 |
| S115 | −308.596 | 2.506 | | | | |
| S116 | −7.704 | 1.494 | 1.619 | 63.334 | −23.84 | L18 |
| S117 | −17.343 | 1.307 | | | | |
| S118 | 20.492 | 1.999 | 1.497 | 81.608 | 18.35 | L19 |
| S119 | −15.908 | 1 | | | | |
| S120 | ∞ | 0.4 | 1.517 | 64.167 | | OF1 |
| S121 | ∞ | 2.3 | | | | |
| S122 | ∞ | 0.4 | 1.517 | 64.167 | | CG1 |
| S123 | ∞ | 0.487 | | | | |

Table 2 shows the parameters and condition values for conditions (1)-(11) in accordance with the first embodiment of the invention. It can be seen from Table 2 that the lens assembly 1 of the first embodiment satisfies the conditions (1)-(11).

TABLE 2

| $T_{67}$ | 16.03 mm | $CT_4$ | 4.932 mm | CT5 | 2.262 mm |
|---|---|---|---|---|---|
| $|f_4/f_7|$ | 7.619 | $|R_{41}/(f_5 + f_6)|$ | 4.461 | $T_{67}/(CT_4-CT_5)$ | 6.004 |
| $|R_{82}/T_{67}|$ | 1.082 | $|R_{82}/R_{11}|$ | 0.441 | $|R_{72}/R_{62}|$ | 6.275 |
| $R_{31}/R_{91}$ | 0.861 | $|R_{51}/R_{31}|$ | 2.791 | $|f_7 + f_8/f_9|$ | 2.763 |
| $|f_2/(f_3-f_5)|$ | 1.904 | $|R_{32}/R_{21}|$ | 1.714 | | |

By the above arrangements of the lenses and stop ST1, the lens assembly 1 of the first embodiment can meet the requirements of optical performance as seen in FIGS. 2A-2D.

Figure 2A:
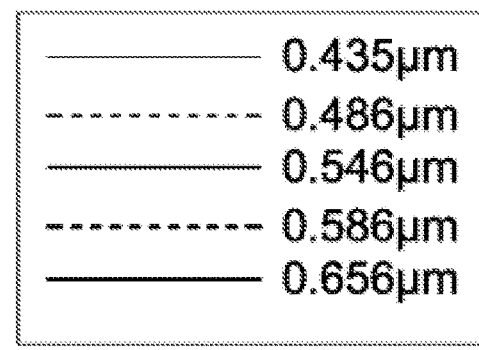
FIG. 2A depicts a longitudinal aberration diagram of the lens assembly in accordance with the first embodiment of the invention.
Figure 2A:
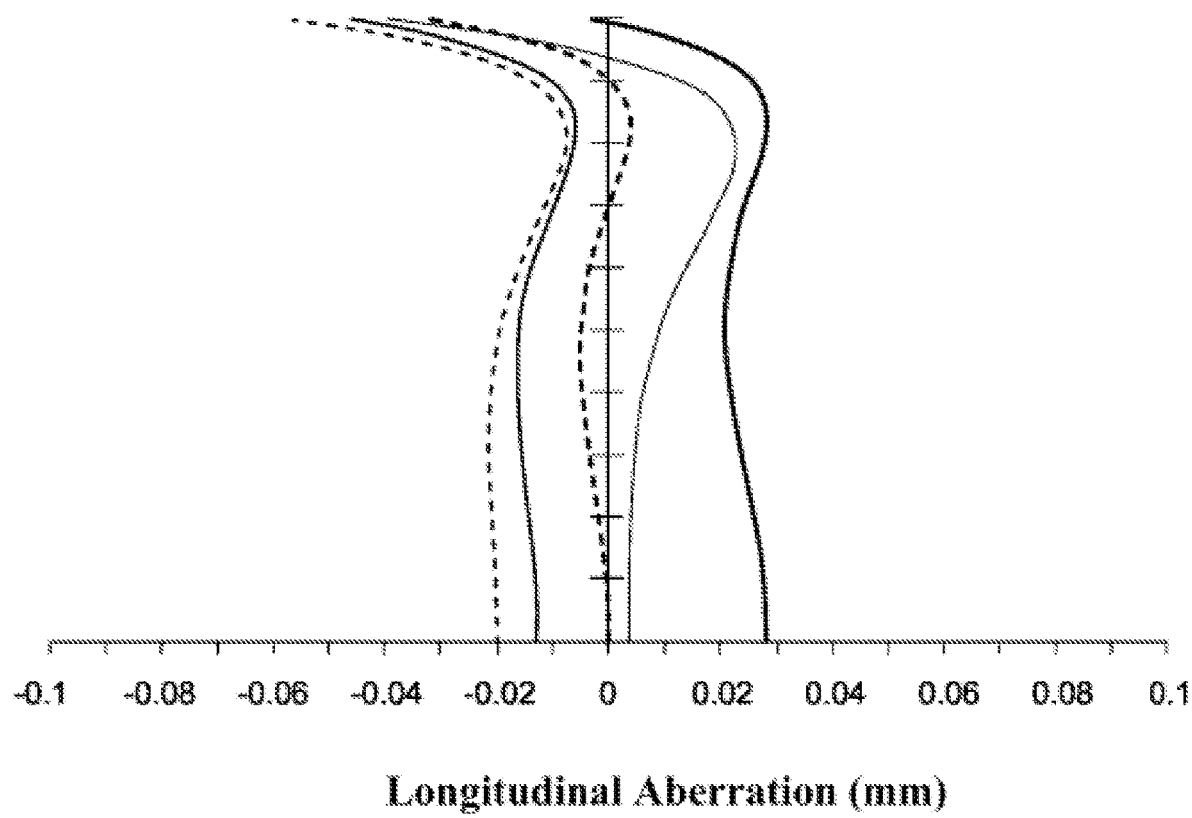
Figure 2B:
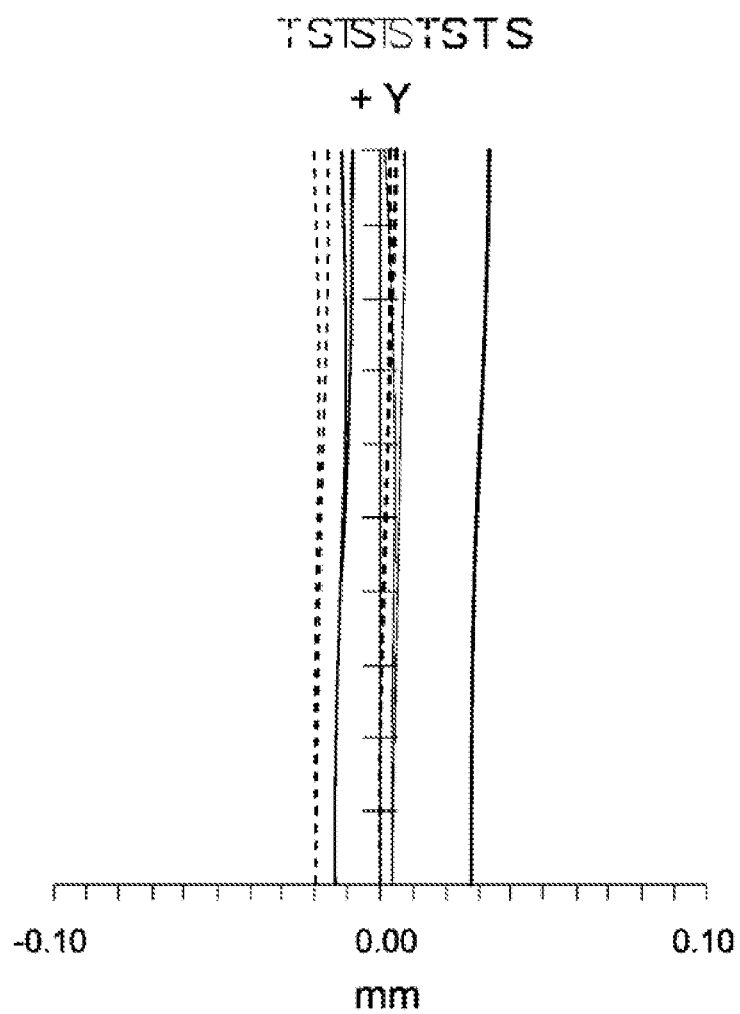
FIG. 2B is a field curvature diagram of the lens assembly in accordance with the first embodiment of the invention.
Figure 2C:
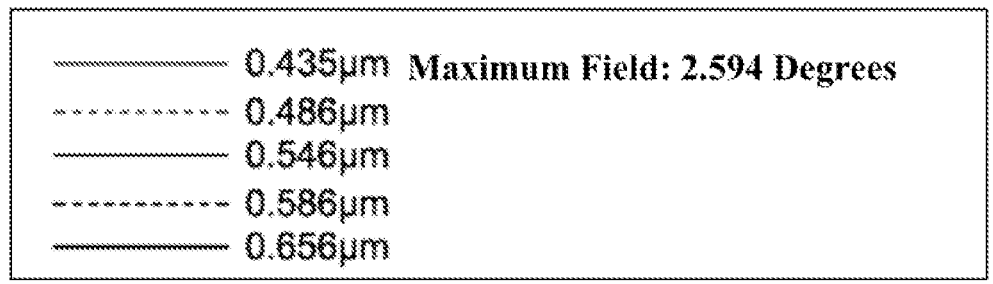
FIG. 2C is a distortion diagram of the lens assembly in accordance with the first embodiment of the invention.
Figure 2C:
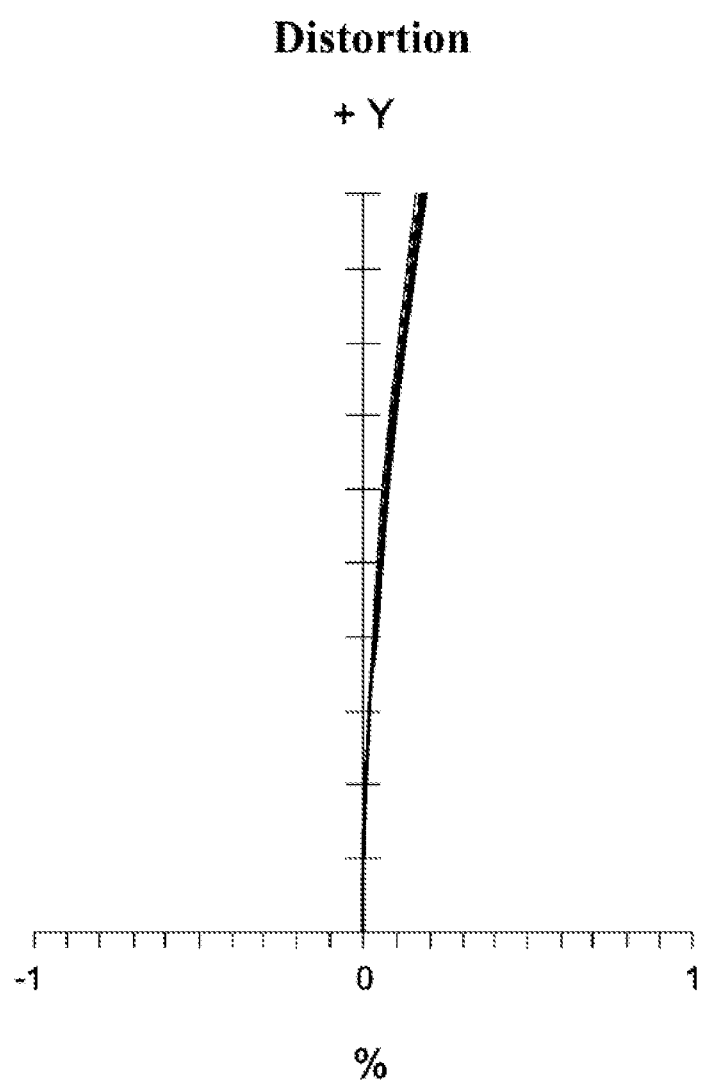
Figure 2D:
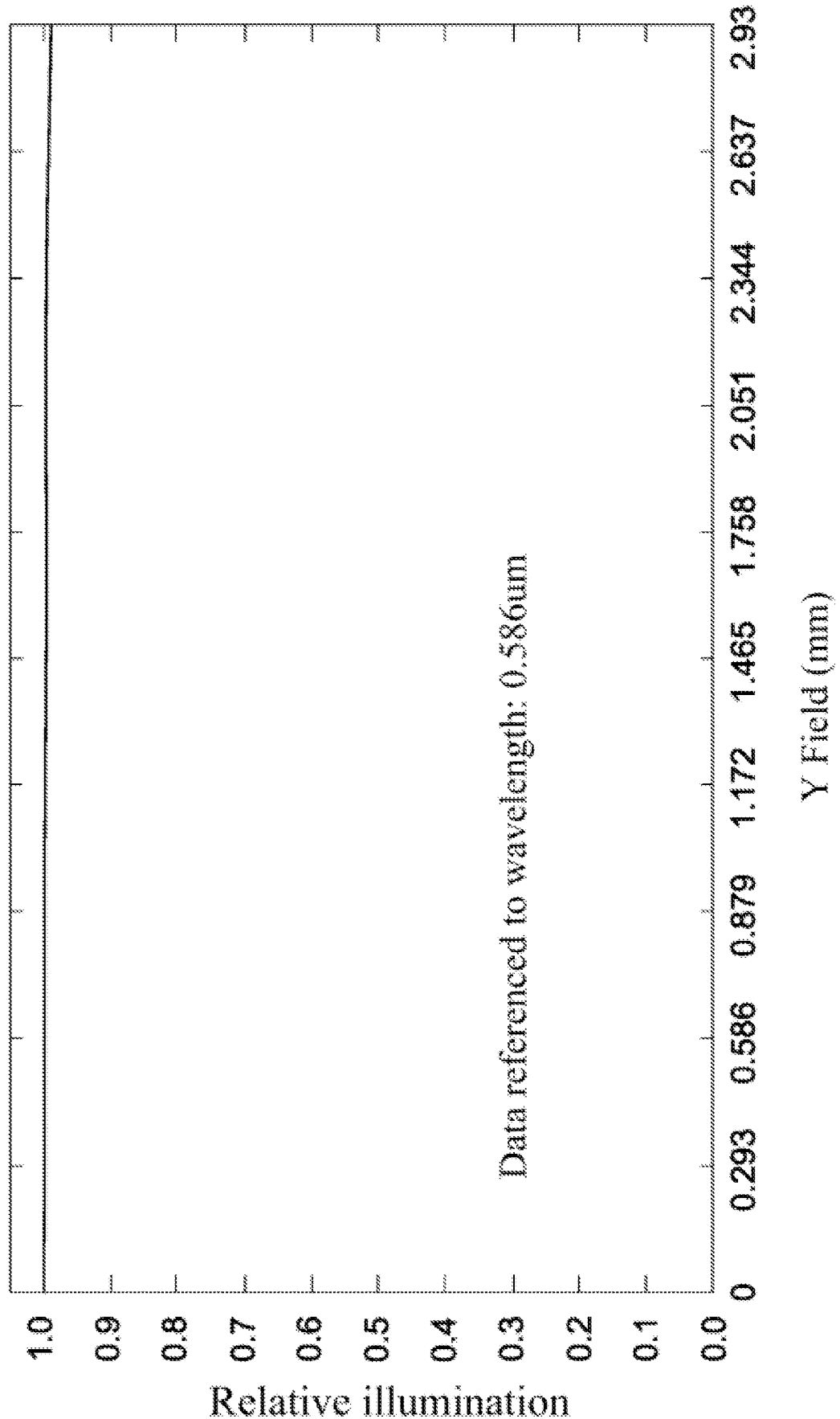
FIG. 2D is a relative illumination diagram of the lens assembly in accordance with the first embodiment of the invention.

It can be seen from FIG. 2A that the longitudinal aberration diagram in the lens assembly 1 of the first embodiment ranges from −0.06 mm to 0.03 mm. It can be seen from FIG. 2B that the field curvature of the tangential direction and sagittal direction in the lens assembly 1 of the first embodiment ranges from −0.03 mm to 0.04 mm. It can be seen from FIG. 2C that the distortion in the lens assembly 1 of the first embodiment ranges from 0% to 0.2%. It can be seen from FIG. 2D that the relative illumination in the lens assembly 1 of the first embodiment ranges from 0.98 to 1.0.

It is obvious that the longitudinal aberration, the field curvature and the distortion of the lens assembly 1 of the first embodiment can be corrected effectively, and the relative illumination of the lens assembly 1 of the first embodiment can meet the requirement. Therefore, the lens assembly 1 of the first embodiment is capable of good optical performance.

Referring to FIG. 3, FIG. 3 is a lens layout and optical path diagram of a lens assembly in accordance with a second embodiment of the invention. The lens assembly 2 includes a first lens L21, a second lens L22, a stop ST2, a third lens L23, a fourth lens L24, a fifth lens L25, a sixth lens L26, a seventh lens L27, an eighth lens L28, a ninth lens L29, an optical filter OF2, and a cover glass CG2, all of which are arranged in order from an object side to an image side along an optical axis OA2. In operation, an image of light rays from the object side is formed at an image plane IMA2.

According to the foregoing, wherein: The second lens L12 is a meniscus lens, wherein the image side surface S24 is a concave surface and the image side surface S24 is a spherical surface; both of the object side surface S220 and image side surface S221 of the optical filter OF2 are plane surfaces; and both of the object side surface S222 and image side surface S223 of the cover glass CG2 are plane surfaces.

With the above design of the lenses and stop ST2 and at least any one of the conditions (1)-(11) satisfied, the lens assembly 2 can have an effective increased resolution, an effective corrected aberration, and is capable of an effective corrected chromatic aberration.

Table 3 shows the optical specification of the lens assembly 2 in FIG. 3.

TABLE 3

Effective Focal Length = 63.086 mm F-number = 2.8
Total Lens Length = 57.016 mm Field of View = 5.31 degrees

| Surface Number | Radius of Curvature (mm) | Thickness (mm) | Nd | Vd | Effective Focal Length (mm) | Remark |
|---|---|---|---|---|---|---|
| S21 | 33.522 | 4.324 | 1.497 | 81.608 | 38.53 | L21 |
| S22 | −42.778 | 0.482 | | | | |
| S23 | −35.345 | 1.874 | 1.654 | 39.683 | −50.19 | L22 |
| S24 | 471.736 | 0.776 | | | | |
| S25 | ∞ | 0.384 | | | | ST2 |
| S26 | 18.807 | 5.854 | 1.497 | 81.608 | 28.58 | L23 |
| S27 | −52.09 | 0.35 | | | | |
| S28 | −166.127 | 3.978 | 1.847 | 23.778 | 106.92 | L24 |
| S29 | −59.251 | 0.73 | | | | |
| S210 | −34.911 | 1.753 | 1.718 | 63.334 | −15.07 | L25 |
| S211 | 12.945 | 1.873 | | | | |
| S212 | 14.12 | 3.098 | 1.497 | 81.608 | 31.64 | L26 |
| S213 | 128.292 | 17.685 | | | | |
| S214 | −15.222 | 1.974 | 1.497 | 81.608 | −42.09 | L27 |
| S215 | −58.301 | 2.521 | | | | |
| S216 | −9.3681 | 1.467 | 1.618 | 63.334 | −16.45 | L28 |
| S217 | −214.931 | 1.338 | | | | |
| S218 | 16.767 | 1.996 | 1.497 | 81.608 | 19.22 | L29 |
| S219 | −18.92 | 1 | | | | |

TABLE 3-continued

Effective Focal Length = 63.086 mm F-number = 2.8
Total Lens Length = 57.016 mm Field of View = 5.31 degrees

| Surface Number | Radius of Curvature (mm) | Thickness (mm) | Nd | Vd | Effective Focal Length (mm) | Remark |
|---|---|---|---|---|---|---|
| S220 | ∞ | 0.4 | 1.517 | 64.167 | | OF2 |
| S221 | ∞ | 2.3 | | | | |
| S222 | ∞ | 0.4 | 1.517 | 64.167 | | CG2 |
| S223 | ∞ | 0.459 | | | | |

Table 4 shows the parameters and condition values for conditions (1)-(11) in accordance with the second embodiment of the invention. It can be seen from Table 4 that the lens assembly 2 of the second embodiment satisfies the conditions (1)-(11).

TABLE 4

| $T_{67}$ | 17.685 mm | $CT_4$ | 3.978 mm | $CT_5$ | 1.753 mm |
|---|---|---|---|---|---|
| $|f_4/f_7|$ | 2.540 | $|R_{41}/(f_5 + f_6)|$ | 10.026 | $T_{67}/(CT_4-CT_5)$ | 7.948 |
| $|R_{82}/T_{67}|$ | 12.153 | $|R_{82}/R_{11}|$ | 6.412 | $|R_{72}/R_{62}|$ | 0.454 |
| $R_{31}/R_{91}$ | 1.122 | $|R_{51}/R_{31}|$ | 1.856 | $|f_7 + f_8|/f_9$ | 3.213 |
| $|f_2/(f_3-f_5)|$ | 1.150 | $|R_{32}/R_{21}|$ | 1.474 | | |

By the above arrangements of the lenses and stop ST2, the lens assembly 2 of the second embodiment can meet the requirements of optical performance as seen in FIGS. 4A-4D.

Figure 4A:
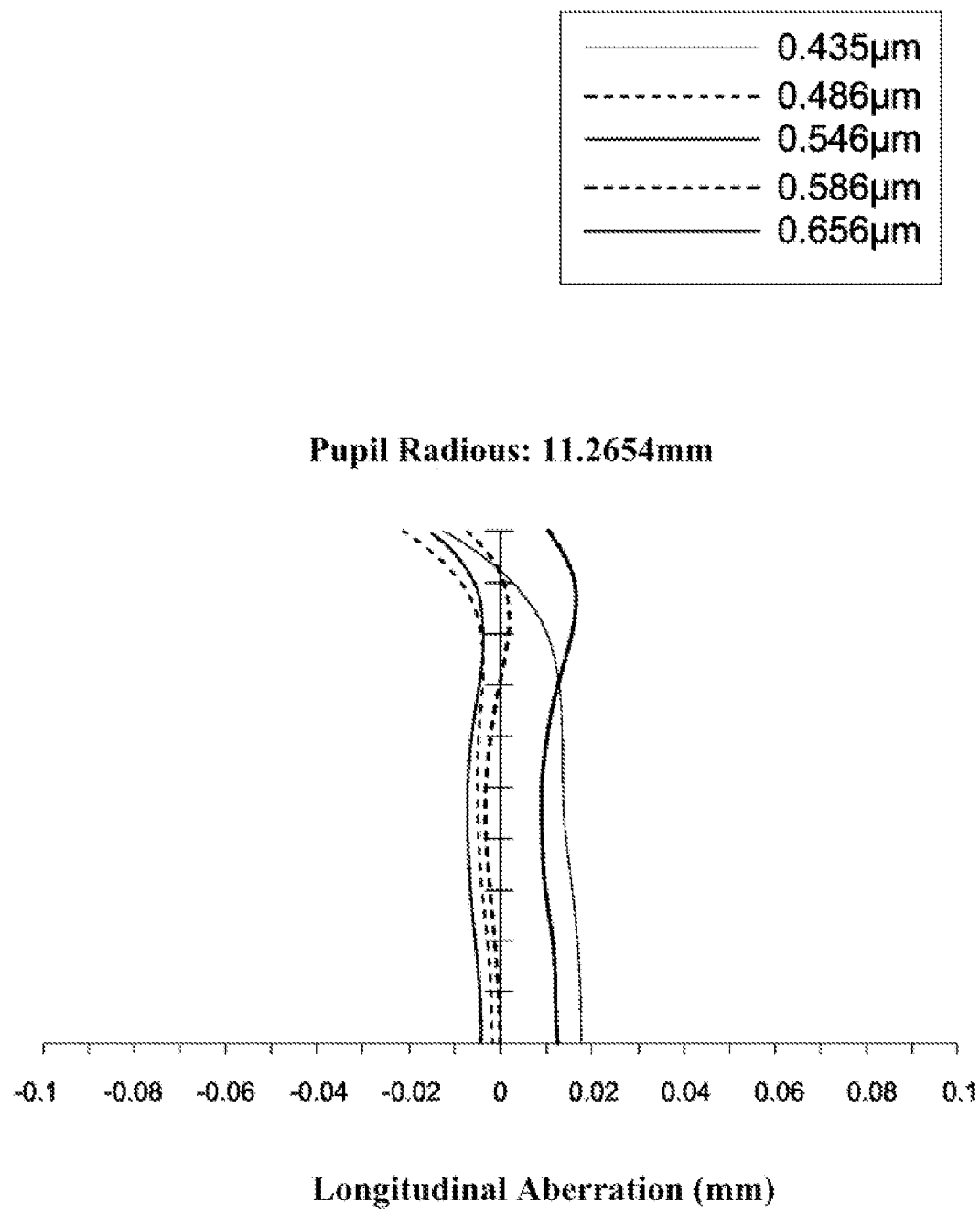
FIG. 4A depicts a longitudinal aberration diagram of the lens assembly in accordance with the second embodiment of the invention.
Figure 4B:
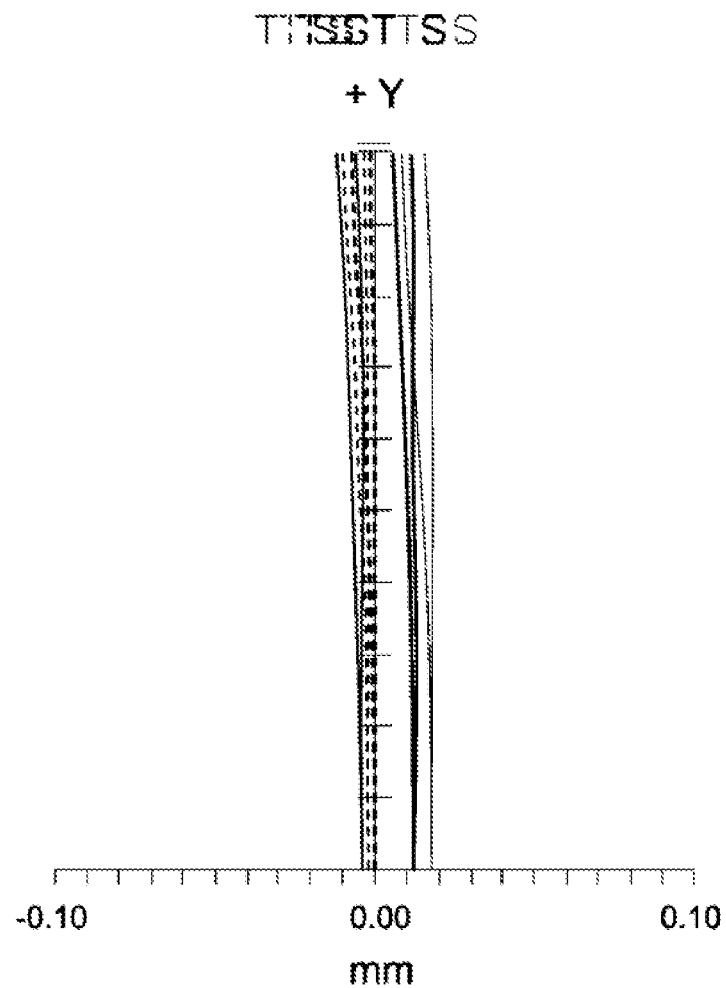
FIG. 4B is a field curvature diagram of the lens assembly in accordance with the second embodiment of the invention.
Figure 4C:
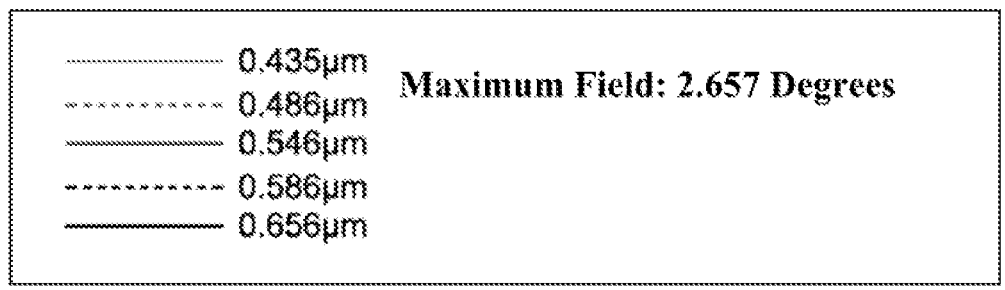
FIG. 4C is a distortion diagram of the wide-angle lens assembly in accordance with the second embodiment of the invention.
Figure 4C:
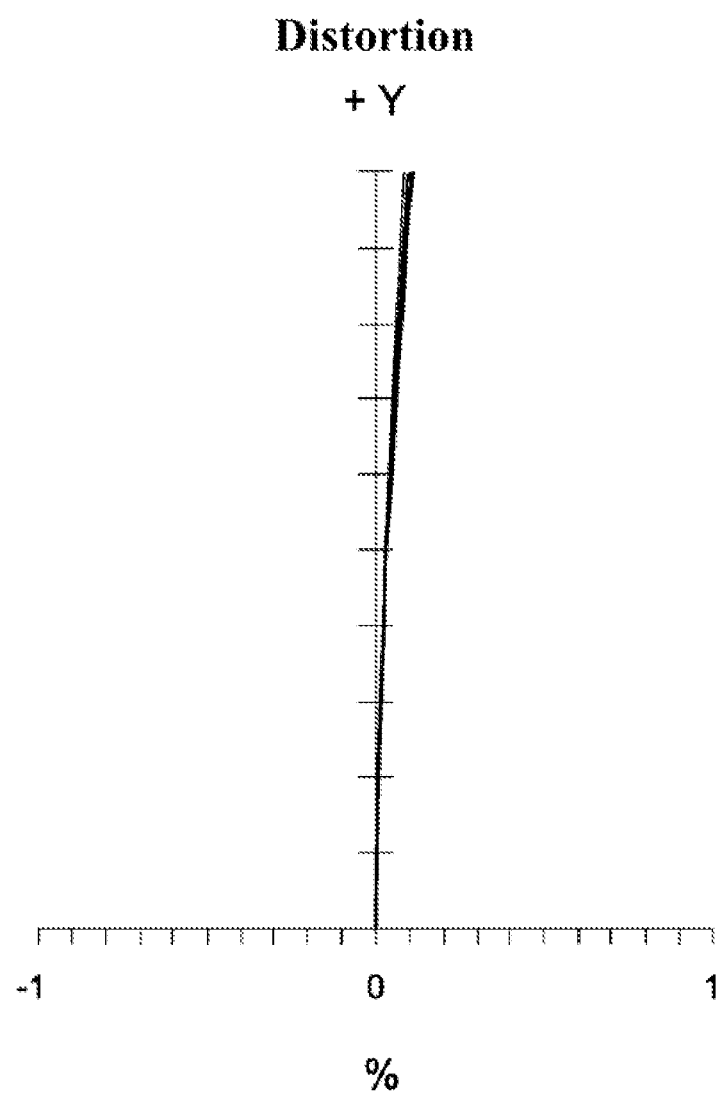
Figure 4D:
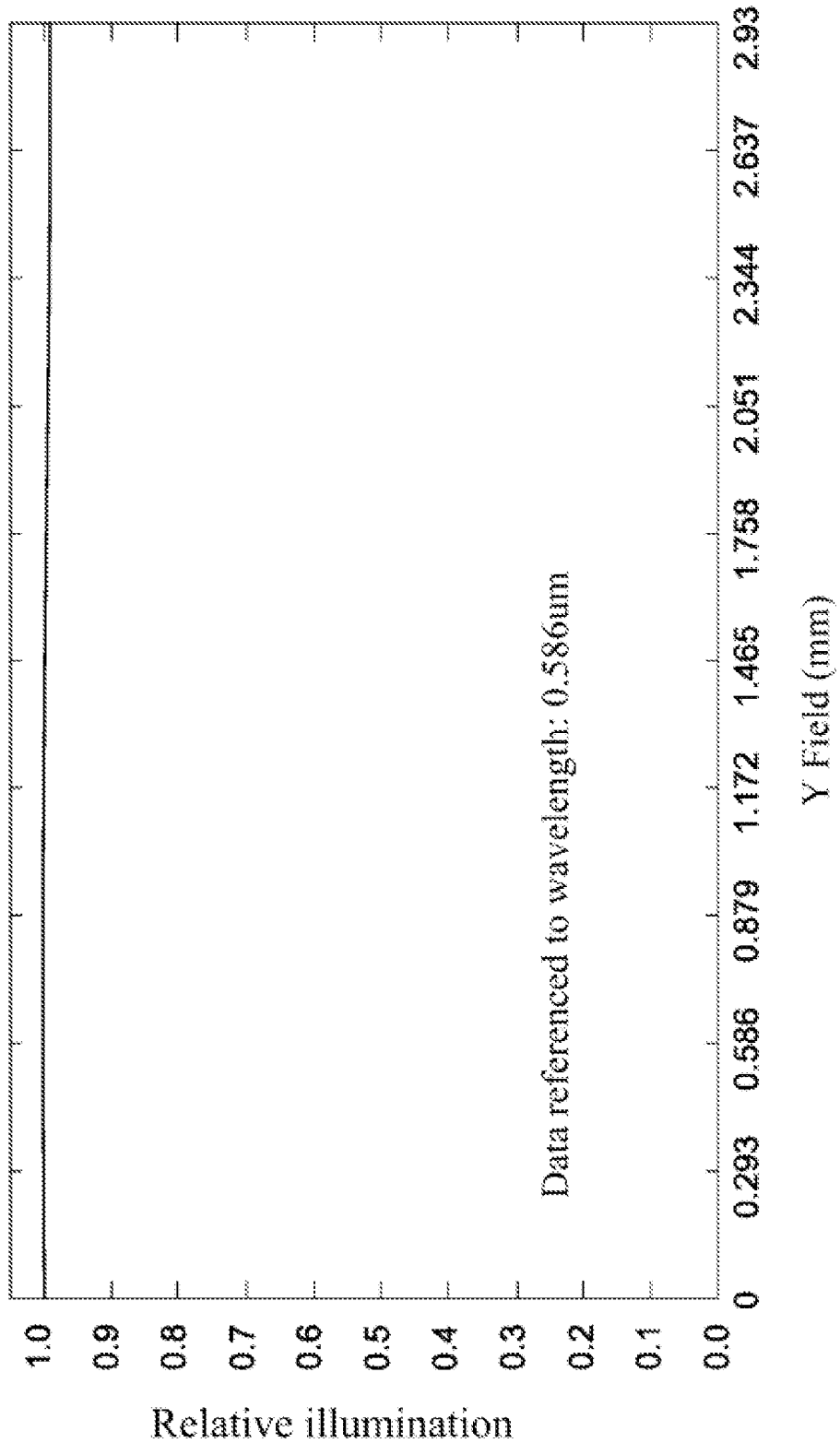
FIG. 4D is a relative illumination diagram of the lens assembly in accordance with the second embodiment of the invention.

It can be seen from FIG. 4A that the longitudinal aberration diagram in the lens assembly 2 of the second embodiment ranges from −0.03 mm to 0.02 mm. It can be seen from FIG. 4B that the field curvature of the tangential direction and sagittal direction in the lens assembly 2 of the second embodiment ranges from −0.02 mm to 0.02 mm. It can be seen from FIG. 4C that the distortion in the lens assembly 2 of the second embodiment ranges from 0% t to 0.1%. It can be seen from FIG. 4D that the relative illumination in the lens assembly 2 of the second embodiment ranges from 0.99 to 1.0.

It is obvious that the longitudinal aberration, the field curvature and the distortion of the lens assembly 2 of the second embodiment can be corrected effectively, and the relative illumination of the lens assembly 2 of the second embodiment can meet the requirement. Therefore, the lens assembly 2 of the second embodiment is capable of good optical performance.

Referring to FIG. 5, FIG. 5 is a lens layout and optical path diagram of a lens assembly in accordance with a third embodiment of the invention. The lens assembly 3 includes a first lens L31, a second lens L32, a stop ST3, a third lens L33, a fourth lens L34, a fifth lens L35, a sixth lens L36, a seventh lens L37, an eighth lens L38, a ninth lens L39, an optical filter OF3, and a cover glass CG3, all of which are arranged in order from an object side to an image side along an optical axis OA3. In operation, an image of light rays from the object side is formed at an image plane IMA3.

According to the foregoing, wherein: the third lens L32 is a plane-concave lens, wherein the image side surface S34 is a plane surface; both of the object side surface S320 and image side surface S321 of the optical filter OF3 are plane surfaces; and both of the object side surface S322 and image side surface S323 of the cover glass CG3 are plane surfaces.

With the above design of the lenses and stop ST3 and at least any one of the conditions (1)-(11) satisfied, the lens assembly 3 can have an effective increased resolution, an effective corrected aberration, and is capable of an effective corrected chromatic aberration.

Table 5 shows the optical specification of the lens assembly 3 in FIG. 5.

TABLE 5

Effective Focal Length = 64.185 mm F-number = 2.8
Total Lens Length = 57.006 mm Field of View = 5.22 degrees

| Surface Number | Radius of Curvature (mm) | Thickness (mm) | Nd | Vd | Effective Focal Length (mm) | Remark |
|---|---|---|---|---|---|---|
| S31 | 36.629 | 4.135 | 1.497 | 81.608 | 43.66 | L31 |
| S32 | −51.263 | 0.478 | | | | |
| S33 | −43.23 | 1.955 | 1.654 | 39.683 | −65.86 | L32 |
| S34 | ∞ | 0.862 | | | | |
| S35 | ∞ | 0.464 | | | | ST3 |
| S36 | 17.601 | 6.025 | 1.497 | 81.608 | 28.74 | L33 |
| S37 | −67.176 | 0.467 | | | | |
| S38 | −102.852 | 4.671 | 1.847 | 23.778 | 135.91 | L34 |
| S39 | −55.448 | 0.64 | | | | |
| S310 | −38.44 | 2.095 | 1.618 | 63.334 | −15.28 | L35 |
| S311 | 12.782 | 1.961 | | | | |
| S312 | 14.279 | 2.887 | 1.497 | 81.608 | 32.8 | L36 |
| S313 | 107.213 | 16.483 | | | | |
| S314 | −14.149 | 1.991 | 1.497 | 81.608 | −33.54 | L37 |
| S315 | −97.968 | 2.51 | | | | |
| S316 | −8.906 | 1.488 | 1.618 | 63.334 | −18.92 | L38 |
| S317 | −39.773 | 1.315 | | | | |
| S318 | 21.573 | 1.998 | 1.497 | 81.608 | 18.75 | L39 |
| S319 | −15.91 | 1 | | | | |
| S320 | ∞ | 0.4 | 1.517 | 64.167 | | OF3 |
| S321 | ∞ | 2.3 | | | | |
| S322 | ∞ | 0.4 | 1.517 | 64.167 | | CG3 |
| S323 | ∞ | 0.48 | | | | |

Table 6 shows the parameters and condition values for conditions (1)-(11) in accordance with the third embodiment of the invention. It can be seen from Table 6 that the lens assembly 3 of the third embodiment satisfies the conditions (1)-(11).

TABLE 6

| $T_{67}$ | 16.483 mm | $CT_4$ | 4.671 mm | $CT_5$ | 2.095 mm |
|---|---|---|---|---|---|
| $|f_4/f_7|$ | 4.052 | $|R_{41}/(f_5 + f_6)|$ | 5.871 | $T_{67}/(CT_4-CT_5)$ | 6.399 |
| $|R_{82}/T_{67}|$ | 2.413 | $|R_{82}/R_{11}|$ | 1.086 | $|R_{72}/R_{62}|$ | 0.914 |
| $R_{31}/R_{91}$ | 0.816 | $|R_{51}/R_{31}|$ | 2.184 | $|f_7 + f_8|/f_9$ | 2.798 |
| $|f_2/(f_3-f_5)|$ | 1.496 | $|R_{32}/R_{21}|$ | 1.554 | | |

By the above arrangements of the lenses and stop ST3, the lens assembly 3 of the third embodiment can meet the requirements of optical performance as seen in FIGS. 6A-6D.

Figure 6A:
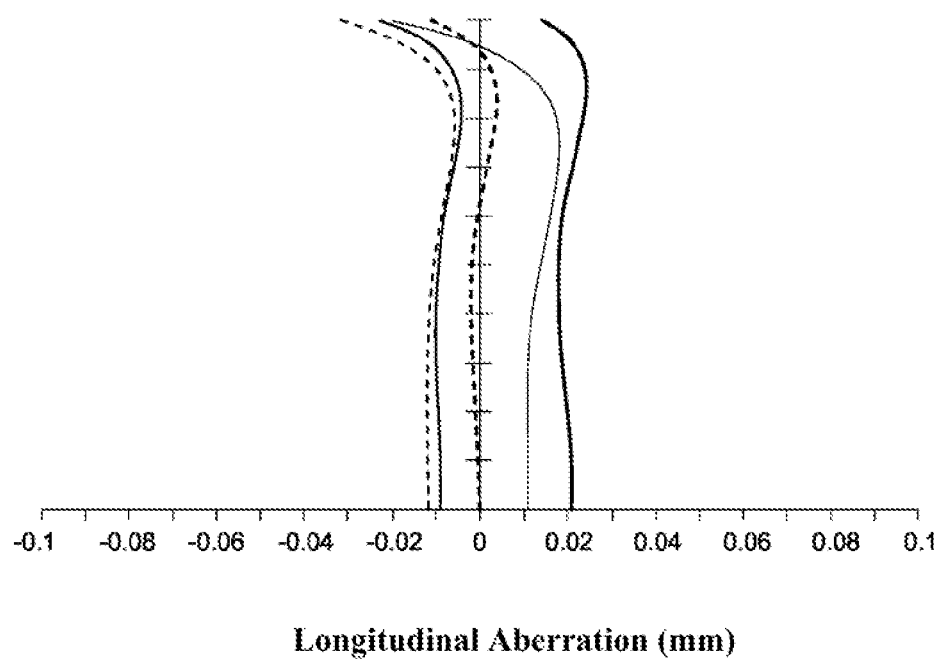
FIG. 6A depicts a longitudinal aberration diagram of the lens assembly in accordance with the third embodiment of the invention.
Figure 6B:
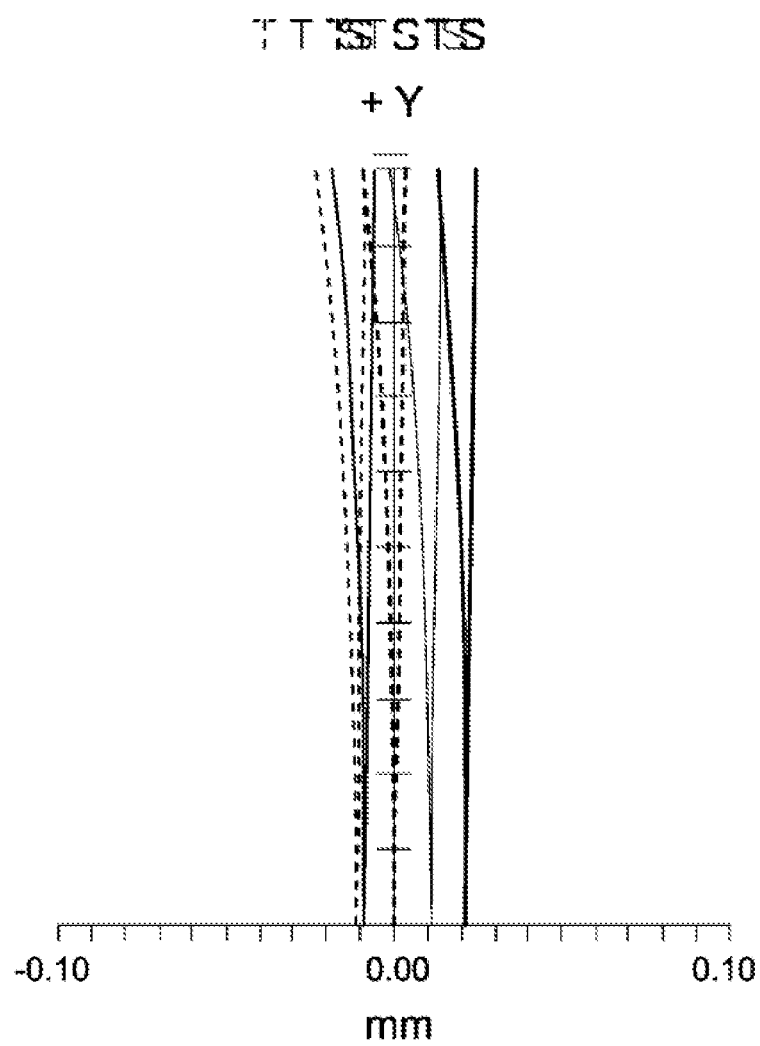
FIG. 6B is a field curvature diagram of the lens assembly in accordance with the third embodiment of the invention.
Figure 6C:
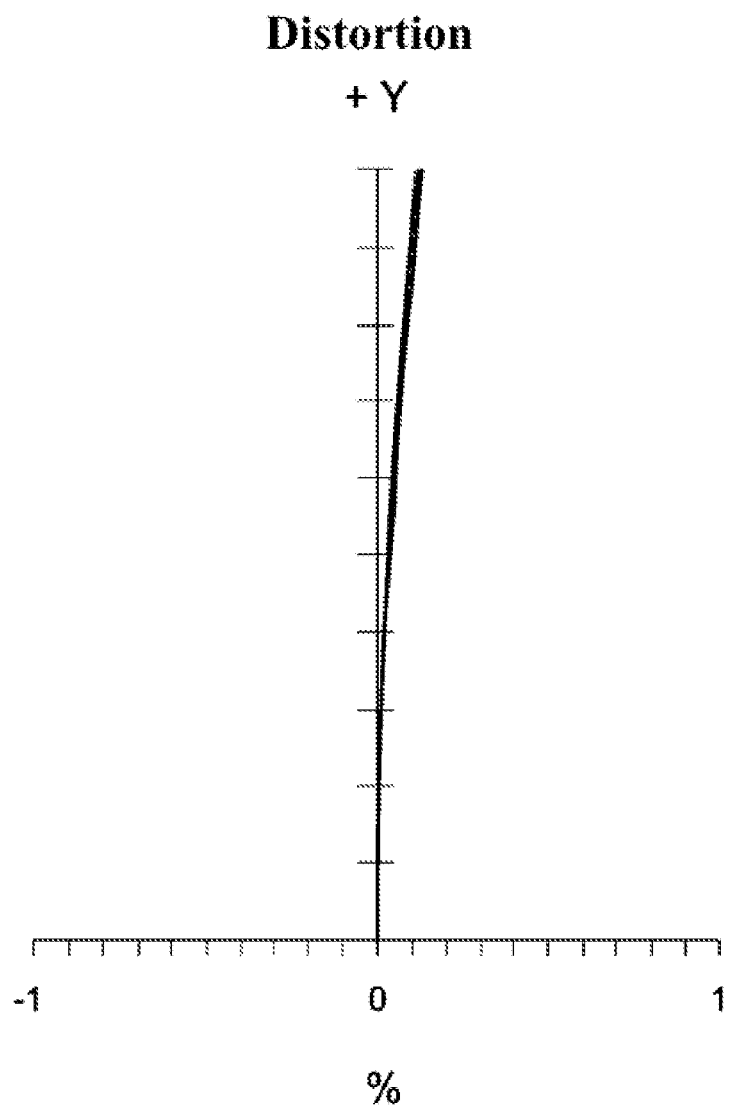
FIG. 6C is a distortion diagram of the lens assembly in accordance with the third embodiment of the invention.

It can be seen from FIG. 6A that the longitudinal aberration diagram in the lens assembly 3 of the third embodiment ranges from −0.04 mm to 0.03 mm. It can be seen from FIG. 6B that the field curvature of the tangential direction and sagittal direction in the lens assembly 3 of the third embodiment ranges from −0.03 mm to 0.03 mm. It can be seen from FIG. 6C that the distortion in the lens assembly 3 of the third embodiment ranges from 0% t to 0.2%. It can be seen from FIG. 6D that the relative illumination in the lens assembly 3 of the third embodiment ranges from 0.99 to 1.0.

It is obvious that the longitudinal aberration, the field curvature and the distortion of the lens assembly 3 of the third embodiment can be corrected effectively, and the relative illumination of the lens assembly 3 of the third embodiment can meet the requirement. Therefore, the lens assembly 3 of the third embodiment is capable of good optical performance.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly comprising:
a first lens which is a biconvex lens with positive refractive power and comprises a convex surface facing an object side, and another convex surface facing an image side;
a second lens which is with negative refractive power and comprises a concave surface facing the object side;
a third lens which is a biconvex lens with positive refractive power and comprises a convex surface facing the object side, and another convex surface facing the image side;
a fourth lens which is with positive refractive power;
a fifth lens which is a biconcave with negative refractive power and comprises a concave surface facing the object side, and another concave surface facing the image side;
a sixth lens which is with positive refractive power;
a seventh lens which is with refractive power;
an eighth lens which is with negative refractive power; and
a ninth lens which is with positive refractive power;
wherein the first lens, the second lens, the third lens, the fourth lens, the fifth lens, the sixth lens, the seventh lens, the eighth lens, and the ninth lens are arranged in order from the object side to the image side along an optical axis;
wherein the lens assembly satisfies at least one of the following conditions:

$1 < |R_{82}/T_{67}| < 12.2;$ $6 < T_{67}/(CT_4 - CT_5) < 8;$ wherein $R_{82}$ is a radius of curvature of an image side surface of the eighth lens, $T_{67}$ is an interval an image side surface of the sixth lens to an object side surface of the seventh lens along the optical axis, $CT_4$ is a thickness of the fourth lens along the optical axis, $CT_5$ is a thickness of the fifth lens along the optical axis.

2. The lens assembly as claimed in claim 1, further comprising a stop disposed between the second lens and the third lens;
the second lens comprises a convex surface or a concave facing or a plane surface facing the image side;
the fourth lens which is a meniscus lens and further comprises a concave surface facing the object side and another convex surface facing the image side;
the sixth lens which is a meniscus lens and further comprises a convex surface facing the object side and another concave surface facing the image side;
the seventh lens which is a meniscus lens with negative refractive power and further comprises a concave surface facing the object side and another convex surface facing the image side;
the eighth lens which is a meniscus lens and further comprises a concave surface facing the object side and another convex surface facing the image side; and
the ninth lens which is a biconvex lens and further comprises a convex surface facing the object side and another convex surface facing the image side.

3. A lens assembly comprising:
a first lens which is with positive refractive power and comprises a convex surface facing an image side;
a second lens which is with negative refractive power and comprises a concave surface facing the object side and another convex surface or a concave surface or a plane surface facing the image side;
a third lens which is with refractive power and comprises a convex surface facing the image side;
a fourth lens which is a meniscus lens with positive refractive power and comprises a concave surface facing the object and another convex surface facing the image;
a fifth lens which is with negative refractive power and comprises a concave surface facing the image side;
a sixth lens which is with positive refractive power and comprises a concave surface facing the image side;
a seventh lens which is a meniscus lens with refractive power and comprises a concave surface facing the object and another convex surface facing the image;
an eighth lens which is a meniscus lens with negative refractive power and comprises a concave surface facing the object and another convex surface facing the image; and
a ninth lens which is with positive refractive power and comprises a convex surface facing the image;
wherein the first lens, the second lens, the third lens, the fourth lens, the fifth lens, the sixth lens, the seventh lens, the eighth lens, and the ninth lens are arranged in order from the object side to the image side along an optical axis;
wherein the lens assembly satisfies at least one of the following conditions:

$1 < |R_{82}/T_{67}| < 12.2;$ $6 < T_{67}/(CT_4 - CT_5) < 8;$ wherein $R_{82}$ is a radius of curvature of an image side surface of the eighth lens, $T_{67}$ is an interval an image side surface of the sixth lens to an object side surface of the seventh lens along the optical axis, $CT_4$ is a thickness of the fourth lens along the optical axis, $CT_5$ is a thickness of the fifth lens along the optical axis.

4. The lens assembly as claimed in claim 1, wherein the lens assembly satisfies at least one of the following conditions:

$2.5 < |f_4/f_7| < 7.7;$ $1 < |f_2/(f_3 - f_5)| < 2;$ $2.75 < |f_7 + f_8|/f_9 < 3.22;$ $4.3 < |R_{41}/(f_5 + f_6)| < 10.1;$ $0.4 < |R_{82}/R_{11}| < 6.5;$ $1.3 < |R_{32}/R_{21}| < 1.8;$ $0.4 < |R_{72}/R_{62}| < 6.3;$ $0.8 < R_{31}/R_{91} < 1.13;$ $1.8 < |R_{51}/R_{31}| < 2.8;$ wherein $f_2$ is an effective focal length of the second lens, $f_3$ is an effective focal length of the third lens, $f_4$ is an effective focal length of the fourth lens, $f_5$ is an effective focal length of the fifth lens, $f_6$ is an effective focal length of the sixth lens, $f_7$ is an effective focal length of the seventh lens, $f_8$ is an effective focal length of the eighth lens and $f_9$ is an effective focal length of the ninth lens, $R_{11}$ is a radius of curvature of an object side surface of the first lens, $R_{21}$ is a radius of curvature of an object side surface of the second lens, $R_{31}$ is a radius of curvature of an object side surface of the third lens, $R_{32}$ is a radius of curvature of an image side surface of the third lens, $R_{41}$ is a radius of curvature of an object side surface of the fourth lens, $R_{51}$ is a radius of curvature of an object side surface of the fifth lens, $R_{62}$ is a radius of curvature of an image side surface of the sixth lens, $R_{72}$ is a radius of curvature of an image side surface of the seventh lens, $R_{82}$ is a radius of curvature of an image side surface of the eighth lens, $R_{91}$ is a radius of curvature of an object side surface of the ninth lens.

5. The lens assembly as claimed in claim 2, wherein the lens assembly satisfies at least one of the following conditions:

$2.5 < |f_4/f_7| < 7.7$;

$1 < |f_2/(f_3-f_5)| < 2$;

$2.75 < |f_7+f_8|/f_9 < 3.22$;

$4.3 < |R_{41}/(f_5+f_6)| < 10.1$;

$0.4 < |R_{82}/R_{11}| < 6.5$;

$1.3 < |R_{32}/R_{21}| < 1.8$;

$0.4 < |R_{72}/R_{62}| < 6.3$;

$0.8 < R_{31}/R_{91} < 1.13$;

$1.8 < |R_{51}/R_{31}| < 2.8$;

wherein $f_2$ is an effective focal length of the second lens, $f_3$ is an effective focal length of the third lens, $f_4$ is an effective focal length of the fourth lens, $f_5$ is an effective focal length of the fifth lens, $f_6$ is an effective focal length of the sixth lens, $f_7$ is an effective focal length of the seventh lens, $f_8$ is an effective focal length of the eighth lens and $f_9$ is an effective focal length of the ninth lens, $R_{11}$ is a radius of curvature of an object side surface of the first lens, $R_{21}$ is a radius of curvature of an object side surface of the second lens, $R_{31}$ is a radius of curvature of an object side surface of the third lens, $R_{32}$ is a radius of curvature of an image side surface of the third lens, $R_{41}$ is a radius of curvature of an object side surface of the fourth lens, $R_{51}$ is a radius of curvature of an object side surface of the fifth lens, $R_{62}$ is a radius of curvature of an image side surface of the sixth lens, $R_{72}$ is a radius of curvature of an image side surface of the seventh lens, $R_{82}$ is a radius of curvature of an image side surface of the eighth lens, $R_{91}$ is a radius of curvature of an object side surface of the ninth lens.

6. The lens assembly as claimed in claim 3, wherein the lens assembly satisfies at least one of the following conditions:

$2.5 < |f_4/f_7| < 7.7$;

$1 < |f_2/(f_3-f_5)| < 2$;

$2.75 < |f_7+f_8|/f_9 < 3.22$;

$4.3 < |R_{41}/(f_5+f_6)| < 10.1$;

$0.4 < |R_{82}/R_{11}| < 6.5$;

$1.3 < |R_{32}/R_{21}| < 1.8$;

$0.4 < |R_{72}/R_{62}| < 6.3$;

$0.8 < R_{31}/R_{91} < 1.13$;

$1.8 < |R_{51}/R_{31}| < 2.8$;

wherein $f_2$ is an effective focal length of the second lens, $f_3$ is an effective focal length of the third lens, $f_4$ is an effective focal length of the fourth lens, $f_5$ is an effective focal length of the fifth lens, $f_6$ is an effective focal length of the sixth lens, $f_7$ is an effective focal length of the seventh lens, $f_8$ is an effective focal length of the eighth lens and $f_9$ is an effective focal length of the ninth lens, $R_{11}$ is a radius of curvature of an object side surface of the first lens, $R_{21}$ is a radius of curvature of an object side surface of the second lens, $R_{31}$ is a radius of curvature of an object side surface of the third lens, $R_{32}$ is a radius of curvature of an image side surface of the third lens, $R_{41}$ is a radius of curvature of an object side surface of the fourth lens, $R_{51}$ is a radius of curvature of an object side surface of the fifth lens, $R_{62}$ is a radius of curvature of an image side surface of the sixth lens, $R_{72}$ is a radius of curvature of an image side surface of the seventh lens, $R_{82}$ is a radius of curvature of an image side surface of the eighth lens, $R_{91}$ is a radius of curvature of an object side surface of the ninth lens.

* * * * *